(12) United States Patent
Fukagawa

(10) Patent No.: US 10,836,917 B2
(45) Date of Patent: Nov. 17, 2020

(54) CURABLE COMPOSITION AND FILM

(71) Applicant: FUJIFILM Corporation, Tokyo (JP)

(72) Inventor: Kiyotaka Fukagawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/293,931

(22) Filed: Mar. 6, 2019

(65) Prior Publication Data
US 2019/0194478 A1    Jun. 27, 2019

Related U.S. Application Data

(63) Continuation of application No. PCT/JP2017/031071, filed on Aug. 30, 2017.

(30) Foreign Application Priority Data

Sep. 30, 2016    (JP) ................ 2016-194278

(51) Int. Cl.
| | |
|---|---|
| C09D 5/24 | (2006.01) |
| C08L 35/04 | (2006.01) |
| C08J 5/18 | (2006.01) |
| C09D 135/04 | (2006.01) |
| C09D 4/06 | (2006.01) |
| C08J 7/16 | (2006.01) |
| C09D 151/00 | (2006.01) |
| C08F 265/06 | (2006.01) |
| C09D 4/00 | (2006.01) |
| C09D 133/26 | (2006.01) |
| C08F 2/50 | (2006.01) |

(52) U.S. Cl.
CPC .............. *C09D 5/24* (2013.01); *C08F 265/06* (2013.01); *C08J 5/18* (2013.01); *C08J 7/16* (2013.01); *C08L 35/04* (2013.01); *C09D 4/00* (2013.01); *C09D 4/06* (2013.01); *C09D 133/26* (2013.01); *C09D 135/04* (2013.01); *C09D 151/003* (2013.01); *C08F 2/50* (2013.01); *C08J 2335/04* (2013.01); *C08J 2433/02* (2013.01); *C08J 2433/14* (2013.01); *C08L 2201/04* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 2015/0259488 A1 | 9/2015 | Takamoto et al. | |
| 2016/0177006 A1* | 6/2016 | Sano | C08F 212/14 521/27 |

FOREIGN PATENT DOCUMENTS

| | | |
|---|---|---|
| JP | 2011012240 A | 1/2011 |
| JP | 2012102166 A | 5/2012 |
| JP | 2013053082 A | 3/2013 |
| JP | 2013103945 A | 5/2013 |
| JP | 2013194024 A | 9/2013 |
| JP | 2014118442 A | 6/2014 |
| JP | 5669373 B2 | 2/2015 |
| JP | 2015048380 A | 3/2015 |
| WO | 2014050993 A1 | 4/2014 |
| WO | 2016136654 A1 | 9/2016 |

OTHER PUBLICATIONS

International Search Report for PCT/JP2017/031071 dated Nov. 28, 2017[PCT/ISA/210].
Written Opinion for PCT/JP2017/031071 dated Nov. 28, 2017.
International Preliminary Report on Patentability with translation of the Written Opinion dated Apr. 2, 2019 in International Application No. PCT/JP2017/031071.

* cited by examiner

Primary Examiner — William D Young
(74) Attorney, Agent, or Firm — Sughrue Mion, PLLC

(57) ABSTRACT

A curable composition contains at least one polyfunctional compound selected from the group consisting of a compound represented by General Formula (I) and a compound represented by General Formula (II), and an ionic polymer including a repeating unit indicated by General Formula (IV).

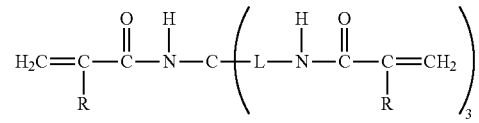

General Formula (I)

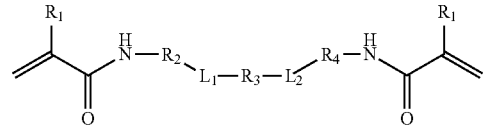

General Formula (II)

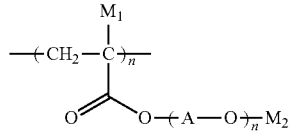

General Formula (IV)

13 Claims, No Drawings

CURABLE COMPOSITION AND FILM

CROSS-REFERENCE TO RELATED APPLICATIONS

This application is a Continuation of PCT International Application No. PCT/JP2017/031071 filed on Aug. 30, 2017, which claims priority under 35 U.S.C § 119 (a) to Japanese Patent Application No. 2016-194278 filed on Sep. 30, 2016. Each of the above application(s) is hereby expressly incorporated by reference, in its entirety, into the present application.

BACKGROUND OF THE INVENTION

1. Field of the Invention

The present invention relates to a curable composition and a film.

2. Description of the Related Art

Compositions which are cured by applying energy (curable compositions) have been widely used in industrial applications for coating materials, paints, printing inks, adhesives, optical materials, laminate materials of electronic products, electrically insulating materials, and the like.

Generally, resins have excellent electrical insulating properties, but easily have static electricity on a surface thereof. In this regard, in recent years, studies have been conducted to impart antistatic properties to curable compositions from the viewpoint of improving the applicability to applications for the laminate material of electronic products, and the like.

For example, JP5669373A discloses an antistatic composition which contains a quaternary cationic (meth)acrylamide-based monomer having a specific structure. Specifically, in the section of Examples thereof, studies have been conducted on a curable composition containing an oligomer or polymer formed from a quaternary cationic (meth)acrylamide-based monomer having a specific structure (for example, an acryloylaminopropyl trimethylammonium p-toluenesulfonate) and a polyfunctional (meth)acrylate compound.

SUMMARY OF THE INVENTION

On the other hand, curable compositions are also required to have excellent film hardness as a basic characteristic.

The present inventors have prepared a curable composition described in JP5669373A and have investigated its physical properties as a film. As a result, they have clarified that in a case where the content of the oligomer or polymer formed from a quaternary cationic (meth)acrylamide-based monomer is increased in order to improve the antistatic properties, the film hardness is noticeably lowered, whereas in a case where the content of the polyfunctional (meth) acrylate compound is increased, the antistatic properties are noticeably lowered. That is, the present inventors have clarified that the obtained film does not necessarily satisfy each of the required levels of the film hardness and the antistatic properties in recent years at the same time, and in particular, the antistatic properties need to be further improved.

Therefore, an object of the present invention is to provide a curable composition which is capable of providing a cured film having both excellent film hardness and excellent antistatic property.

Furthermore, another object of the present invention is to provide a film formed by curing the curable composition.

The present inventors have conducted extensive studies in order to accomplish the objects, and as a result, they have found that the problems can be solved by incorporation of an acrylamide-based polyfunctional compound having a specific structure and an ionic polymer having a specific structure into a curable composition, thereby leading to the completion of the present invention.

That is, the present inventors have found that the objects can be accomplished by the following configurations.

(1) A curable composition comprising:

at least one polyfunctional compound selected from the group consisting of a compound represented by General Formula (I) which will be described later and a compound represented by General Formula (II) which will be described later; and an ionic polymer including a repeating unit represented by General Formula (IV) which will be described later.

(2) The curable composition as described in (1), in which the ionic polymer further includes a repeating unit represented by General Formula (V) which will be described later.

(3) The curable composition as described in (1) or (2), in which the mass ratio of the polyfunctional compound to the ionic polymer is 90/10 to 99.8/0.2.

(4) The curable composition as described in any one of (1) to (3), in which the polyfunctional compound is at least one selected from the group consisting of a compound A which will be described later, a compound B which will be described later, a compound C which will be described later, and a compound D which will be described later.

(5) The curable composition as described in any one of (1) to (4), further comprising an initiator.

(6) A film formed by curing the curable composition as described in any one of (1) to (5).

(7) The film as described in (6), in which the film is an antistatic film.

According to the present invention, it is possible to provide a curable composition which is capable of providing a cured film having both excellent film hardness and excellent antistatic properties.

Furthermore, according to the present invention, it is also possible to provide a film formed by curing the curable composition.

DESCRIPTION OF THE PREFERRED EMBODIMENTS

Hereinafter, the present invention will be described in detail.

Description of configuration requirements described below may be made on the basis of representative embodiments of the present invention, but the present invention is not limited to such embodiments.

Furthermore, in the present specification, numerical value ranges expressed shown using "to" indicate ranges including the numerical values described before and after "to" as the lower limit values and the upper limit values.

In the present specification, a concept of "(meth)acrylamide" includes either or both of acrylamide and methacrylamide, and the same applies to the terms "(meth)acryl", "(meth)acrylate", and "(meth)acryloyl".

In the present specification, in a case where a plurality of substituents or linking groups (hereinafter referred to as substituents or the like) represented by specific symbols are present or a plurality of substituents or the like are defined at the same time, the respective substituents or the like may be the same as or different from each other. The same also applies to the definition of the number of substituents or the like.

Furthermore, in the present specification, in a case where a group (atomic group) is denoted while not specifying whether it is substituted or unsubstituted, the group (atomic group) includes both a group (atomic group) not having a substituent and a group (atomic group) having a substituent. For example, an "alkyl group" includes not only an alkyl group not having a substituent (unsubstituted alkyl group), but also an alkyl group having a substituent (substituted alkyl group).

[Curable Composition]

The curable composition of an embodiment of the present invention (hereinafter also referred to as "the composition of the embodiment of the present invention") contains at least one polyfunctional compound selected from the group consisting of a compound represented by General Formula (I) which will be described later (hereinafter also described as a "polyfunctional (meth)acrylamide compound represented by General Formula (I)") and a compound represented by General Formula (II) and which will be described later (hereinafter also described to as "polyfunctional (meth) acrylamide compound represented by General Formula (II)"), and an ionic polymer including a repeating unit represented by General Formula (IV) which will be described later.

It is thought that since the composition of the embodiment of the present invention takes such a configuration, a film (cured film) having both excellent film hardness and excellent antistatic properties is obtained. A reason therefor is not clear, but is presumed to be approximately as follows.

According to the studies conducted by the present inventors, it was found that a reason why the curable composition of JP5669373A cannot satisfy both the performances of the antistatic properties and the film hardness is due to inappropriate compatibility between an oligomer or polymer formed from a quaternary cationic (meth)acrylamide-based monomer and a polyfunctional (meth)acrylate compound, and correspondingly low uniformity of a cured film obtained therefrom.

The present invention is based on the findings.

That is, both the polyfunctional (meth)acrylamide compound represented by General Formula (I) and the polyfunctional (meth)acrylamide compound represented by General Formula (II) exhibit high compatibility with an ionic polymer including a repeating unit represented by General Formula (IV) which will be described later, and the uniformity of a cured film thus obtained is extremely high. This is thought to make it possible to satisfy both performances of the antistatic properties and the film hardness to an excellent extent.

Hereinafter, the respective components contained in the composition of the embodiment of the present invention will be specifically described.

<Polyfunctional Compound>

The composition of the embodiment of the present invention contains at least one polyfunctional compound selected from the group consisting of a polyfunctional (meth)acrylamide compound represented by General Formula (I) and a polyfunctional (meth)acrylamide compound represented by General Formula (II).

Hereinafter, the polyfunctional compound will be described.

(Polyfunctional (Meth)Acrylamide Compound Represented by General Formula (I))

General Formula (I)

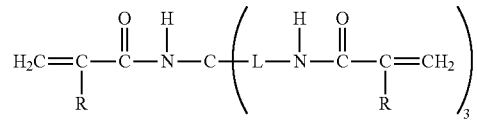

In General Formula (I), R represents a hydrogen atom or a methyl group. In a case where a plurality of R's are present, they may be the same as or different from each other.

L represents —O—, an alkylene group having 2 to 4 carbon atoms, or a divalent linking group formed by combination thereof. Further, a carbon atom is preferably positioned at a position adjacent to the nitrogen atom in the amide group adjacent to L. That is, as the group adjacent to the nitrogen atom in the amide group, an alkylene group having 2 to 4 carbon atoms is preferably positioned.

Examples of the "divalent linking group formed by combination thereof" include an alkylene group having 2 to 4 carbon atoms, including —O—, such as —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, and —CH$_2$OCH$_2$CH$_2$CH$_2$—; and a group represented by —(O-alkylene group (having 2 to 4 carbon atoms))$_n$— (n represents an integer of 2 or more. An upper limit thereof is not particularly limited, but may be approximately 100).

Among those, from the viewpoint that the effects of the present invention are more excellent, it is preferable that L is an alkylene group having 2 to 4 carbon atoms, including —O—.

In addition, in a case where a plurality of L's are present, they may be the same as or different from each other.

(Polyfunctional (Meth)Acrylamide Compound Represented by General Formula (II))

General Formula (II)

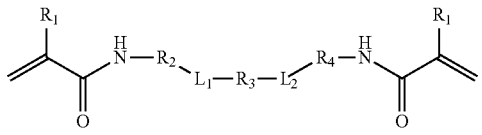

In General Formula (II), R$_1$ represents a hydrogen atom or a methyl group. In a case where a plurality of R$_1$'s are present, they may be the same as or different from each other.

R$_2$ and R$_4$ each independently represent —O—, an alkylene group having 1 to 4 carbon atoms, or a divalent linking group formed by combination thereof. A carbon atom is preferably positioned at a position adjacent to the nitrogen atom in the amide group adjacent to R$_2$ and R$_4$. That is, as the group adjacent to the nitrogen atom in the amide group, an alkylene group having 1 to 4 carbon atoms is preferably positioned.

Examples of the "divalent linking group formed by combination thereof" include an alkylene group having 1 to 4 carbon atoms, including —O—, such as —OCH$_2$—, —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, and —CH$_2$OCH$_2$CH$_2$CH$_2$—; and a group represented by —(O-alkylene group (having 1 to 4 carbon atoms))$_n$—. Here, n represents an integer of 2 or more. An upper limit thereof is not particularly limited, but may be approximately 100.

Furthermore, in each of the groups exemplified as the "divalent linking group formed by combination thereof", any of the two bonding positions may be bonded to the amide group.

Among those, from the viewpoint that the effects of the present invention are more excellent, it is preferable that R$_2$ and R$_4$ each independently represent an alkylene group having 1 to 4 carbon atoms or an alkylene group having 1 to 4 carbon atoms, including —O—.

In General Formula (II), R$_3$ represents —O—, an alkylene group having 1 to 4 carbon atoms, a group represented by General Formula (III), or a divalent linking group formed by combination thereof.

Examples of the "divalent linking group formed by combination thereof" include the groups described above for R$_2$ and R$_4$. Further, in a case where the group represented by General Formula (III) is combined with another group, it is preferable that an alkylene group having 1 to 4 carbon atoms is bonded to the nitrogen atom in the group represented by General Formula (III).

Among those, from the viewpoint that the effects of the present invention are more excellent, it is preferable that R$_3$ is an alkylene group having 1 to 4 carbon atoms, an alkylene group having 1 to 4 carbon atoms, including —O—, or a group represented by General Formula (III).

L$_1$ and L$_2$ each independently represent a single bond or a group represented by General Formula (III).

In a case where R$_3$ represents General Formula (III), it is preferable that L$_1$ and L$_2$ are both a single bond.

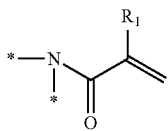

General Formula (III)

In General Formula (III), R$_1$ represents a hydrogen atom or a methyl group, and * represents a bonding position. Further, a carbon atom is usually positioned at *.

Specific examples of the polyfunctional compound are shown below.

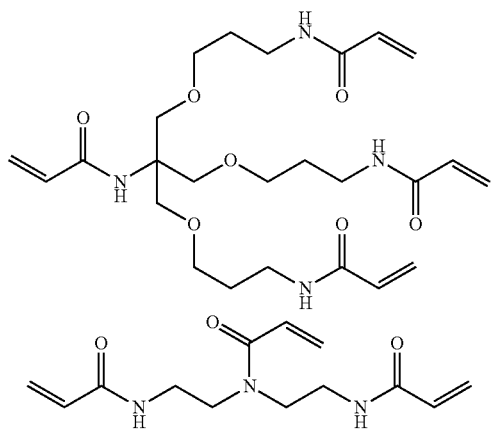

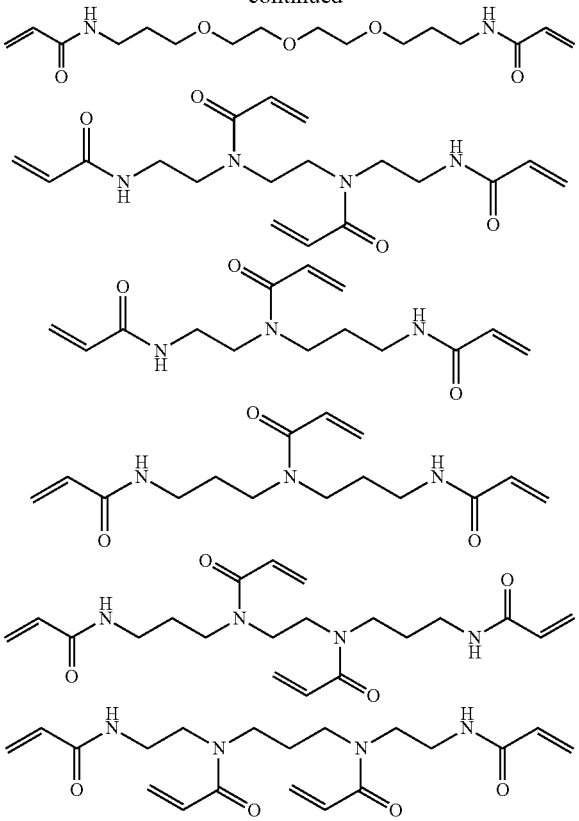

From the viewpoint that the polyfunctional compound exhibits high compatibility with an ionic polymer which will be described later is exhibited, and thus, the effects of the present invention are more excellent, the polyfunctional compound is preferably the compound represented by General Formula (II), and among those, at least one selected from the group consisting of the following compound A, the following compound B, the following compound C, and the following compound D is more preferable.

Compound A

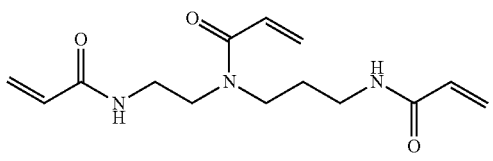

Compound B

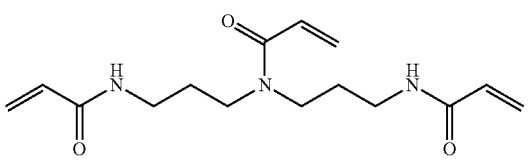

Compound C

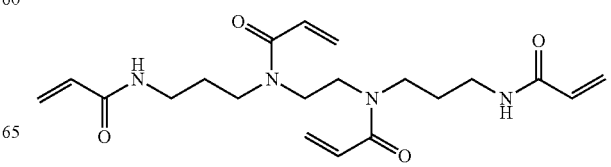

Compound D

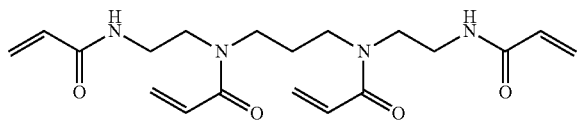

As the polyfunctional compound, various commercially available products can be used, or the polyfunctional compound can be synthesized, for example, by a method described in JP2013-502654A.

The content of the polyfunctional compound in the composition of the embodiment of the present invention is not particularly limited, but is preferably 50.0% to 97.0% by mass, and more preferably 70.0% to 97.0% by mass, with respect to the total solid content.

Furthermore, the polyfunctional compound may be used singly or in combination of two or more kinds thereof. In a case where two or more kinds of the polyfunctional compounds are used in combination, the total content thereof is preferably within the range.

Furthermore, in the present specification, the solid content is intended to mean components constituting the film (cured film), and the solid content does not include solvents. Since the monomer is a component which can constitute the cured film, the monomer is included in the solid content even in a case where it is a liquid.

<Ionic Polymer>

The composition of the embodiment of the present invention contains an ionic polymer including a repeating unit represented by General Formula (IV). Further, in the present specification, the expression of being "ionic" is intended to mean having a group including a salt structure serving as a positive charge, a negative charge, or a pair thereof (hereinafter also referred to as an "ionic group").

The ionic polymer is not particularly limited in terms of its structure as long as the above-mentioned ionic group is introduced thereinto. That is, the ionic polymer may have an ionic group in the polymer terminal, and may also further have a repeating unit including an ionic group, in addition to a repeating unit represented by General Formula (IV). From the viewpoints that the antistatic properties are more excellent and the compatibility with the above-mentioned polyfunctional compound is more excellent, it is preferable that the ionic polymer has a repeating unit including an ionic group.

Hereinafter, the repeating unit represented by General Formula (IV) will be described.

General Formula (IV)

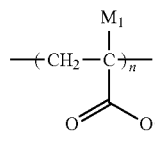

In General Formula (IV), $M_1$ represents a hydrogen atom or a methyl group, $M_2$ represents a hydrogen atom, or a substituted or unsubstituted hydrocarbon group having 4 to 25 carbon atoms, A represents a substituted or unsubstituted alkylene group having 2 to 5 carbon atoms, and n represents an integer of 3 to 50.

As $M_1$, the methyl group is preferable.

Examples of the substituted or unsubstituted hydrocarbon group having 4 to 25 carbon atoms represented by $M_2$ include an aliphatic hydrocarbon group having 4 to 25 carbon atoms and an aromatic hydrocarbon group having 6 to 25 carbon atoms, and from the viewpoint of the compatibility with the above-mentioned polyfunctional compound, the aliphatic hydrocarbon group having 4 to 25 carbon atoms is preferable, an aliphatic hydrocarbon group having 4 to 20 carbon atoms is more preferable, and an aliphatic hydrocarbon group having 6 to 18 carbon atoms is still more preferable.

The aliphatic hydrocarbon group may be linear, branched, or and cyclic, and among these, a linear or branched hydrocarbon group is preferable.

The hydrocarbon group having 4 to 25 carbon atoms represented by $M_2$ may have a substituent, and examples of the substituent include a hydroxyl group, a methoxy group, and an ethoxy group.

Furthermore, as $M_2$, among those, the hydrogen atom or the aliphatic hydrocarbon group having 4 to 25 carbon atoms is preferable, and the aliphatic hydrocarbon group having 4 to 25 carbon atoms is more preferable.

As the alkylene group having 2 to 5 carbon atoms represented by A, $-CH_2CH_2-$, $-CH_2CH(CH_3)-$, $-CH(CH_3)CH_2-$, or $-CH_2CH_2CH_2-$ is preferable.

The alkylene group having 2 to 5 carbon atoms represented by A may have a substituent, and examples of the substituent include a hydroxyl group, a methoxy group, and an ethoxy group.

Moreover, the alkylene group having 2 to 5 carbon atoms represented by A may be of one kind or of two or more kinds. That is, the oxyalkylene group represented by $-(A-O)_n-$ in General Formula (IV) may be, for example, $-(CH_2CH_2O)_p-(CH_2CH(CH_3)O)_q-$, with $p+q=n$.

From the viewpoint of the compatibility, among those, n is preferably 3 to 30, more preferably 3 to 20, and still more preferably 6 to 20.

Furthermore, the repeating unit represented by General Formula (IV) may be used singly or in combination of two or more kinds thereof.

The ionic polymer preferably includes a repeating unit having a quaternary ammonium salt structure as the repeating unit having an ionic group. The quaternary ammonium salt structure is not particularly limited, but is preferably, for example, a structure represented by General Formula (a1). Further, in General Formula (a1), * represents a bonding position.

(a1)

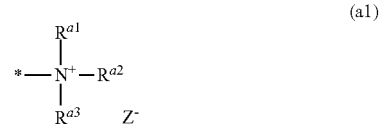

In General Formula (a1), $R^{a1}$ to $R^{a3}$ each independently represent an alkyl group having 1 to 10 carbon atoms. At least two of $R^{a1}$ to $R^{a3}$ may be bonded to each other to form a cyclic structure. Further, $Z^-$ represents a monovalent anion.

Among those, as the repeating unit having an ionic group, a repeating unit represented by General Formula (V) is preferable.

General Formula (V)

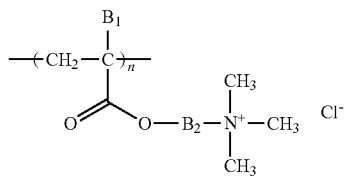

In General Formula (V), $B_1$ represents a hydrogen atom or a methyl group, and $B_2$ represents a substituted or unsubstituted alkylene group having 2 to 5 carbon atoms.

As $B_1$, the methyl group is preferable.

As the alkylene group having 2 to 5 carbon atoms represented by $B_2$, —$CH_2CH_2$— or —$CH_2CH_2CH_2$— is preferable.

The alkylene group having 2 to 5 carbon atoms represented by $B_2$ may have a substituent, and examples of the substituent include a hydroxyl group, a methoxy group, and an ethoxy group.

Furthermore, the repeating unit represented by General Formula (V) may be used singly or in combination of two or more kinds thereof.

The content of the repeating unit represented by General Formula (IV) (the total content of the repeating units in a case where a plurality of kinds of the repeating units are included) is preferably 20% to 70% by mole, more preferably 25% to 55% by mole, and still more preferably 25% to 40% by mole, with respect to all the repeating units in the ionic polymer.

In addition, the content of the repeating unit represented by General Formula (V) (the total content of the repeating units in a case where a plurality of kinds of the repeating units are included) is preferably 30% to 80% by mole, more preferably 35% to 70% by mole, and still more preferably 40% to 60% by mole, with respect to all the repeating units in the ionic polymer.

Moreover, from the viewpoints of further improving the compatibility with the above-mentioned polyfunctional compound ad further enhancing the film hardness, the ionic polymer may further have repeating units other than the repeating unit represented by General Formula (IV) and the repeating unit represented by General Formula (V).

Such other repeating units are not particularly limited, but examples thereof include repeating units derived from an alkyl (meth)acrylate, such as methyl (meth)acrylate, ethyl (meth)acrylate, propyl (meth)acrylate, butyl (meth)acrylate, 2-ethylhexyl (meth)acrylate, dodecyl (meth)acrylate, and octadecyl (meth)acrylate; repeating units derived from a hydroxyalkyl (meth)acrylate, such as hydroxyethyl (meth)acrylate, hydroxypropyl (meth)acrylate, and hydroxybutyl (meth)acrylate; and repeating units derived from various (meth)acrylates, such as benzyl (meth)acrylate, cyclohexyl (meth)acrylate, isobornyl (meth)acrylate, dicyclopentenyl (meth)acrylate, dicyclopentenyloxyethyl (meth)acrylate, ethoxyethyl (meth)acrylate, ethylcarbitol (meth)acrylate, butoxyethyl (meth)acrylate, cyanoethyl (meth)acrylate, and glycidyl (meth)acrylate.

In addition, such other repeating units may be used singly or in combination of two or more kinds thereof.

In a case where the ionic polymer includes the copymerizable repeating unit, the content thereof (the total content of the repeating units in a case where a plurality of kinds of the repeating units are included) is preferably 10% to 40% by mole, more preferably 10% to 30% by mole, still more preferably 10% to 25% by mole, with respect to all the repeating units in the ionic polymer.

From the viewpoint that the film hardness and the antistatic properties are more excellent, the weight-average molecular weight (Mw) of the ionic polymer is preferably 5,000 to 800,000, more preferably 20,000 to 800,000, and still more preferably 20,000 to 600,000. In particular, by setting the weight-average molecular weight to 20,000 to 600,000, generation of unevenness due to bleeding-out can be suppressed, in addition to further improvement of the antistatic properties.

Incidentally, in the present invention, the weight-average molecular weight (Mw) is a value in terms of polystyrene, as determined by a gel permeation chromatography (GPC) method using tetrahydrofuran (THF) as a developing solvent.

The content of the ionic polymer in the composition of the embodiment of the present invention is not particularly limited, but is usually 0.05% to 30% by mass, and preferably 0.05% to 20% by mass, with respect to the total solid content.

In addition, the ionic polymer may be used singly or in combination of two or more kinds thereof. In a case where two or more kinds of the ionic polymers are used in combination, the total content thereof is preferably within the range.

Furthermore, in the composition of the embodiment of the present invention, from the viewpoint of maintaining the antistatic properties and the film hardness to a more excellent extent, the mass ratio of the polyfunctional compound to the ionic polymer (the mass of the polyfunctional compound/the mass of the ionic polymer) is preferably 90/10 to 99.8/0.2.

<Initiator>

It is preferable that the composition of the embodiment of the present invention contains an initiator.

The initiator is not particularly limited, but among the initiators, a thermal polymerization initiator or a photopolymerization initiator is preferable, and the photopolymerization initiator is more preferable.

Examples of the photopolymerization initiator include an alkynephenone-based photopolymerization initiator, a methoxyketone-based photopolymerization initiator, an acylphosphine oxide-based photopolymerization initiator, a hydroxyketone-based photopolymerization initiator (such as IRGACURE 184; 1,2-α-hydroxyalkylphenone), an aminoketone-based photopolymerization initiator (such as 2-methyl-1-[4-(methylthio)phenyl]-2-morpholino-propan-1-one (IRGACURE (registered trademark) 907)), an oxime-based photopolymerization initiator, and an oxyphenylacetic ester-based photopolymerization initiator (IRGACURE (registered trademark) 754).

Examples of other initiators include an azo-based polymerization initiator (for example, V-50 and V-601), a persulfate-based polymerization initiator, a peroxysulfuric acid-based polymerization initiator, and a redox-based polymerization initiator.

The content of the initiator in the composition of the embodiment of the present invention is not particularly limited, but is preferably 0.5% to 10% by mass, and more preferably 1.0% to 5.0% by mass, with respect to the total solid content.

In addition, the initiator may be used singly or in combination of two or more kinds thereof. In a case where two or more kinds of the initiators are used in combination, the total content thereof is preferably within the range.

<Solvent>

The composition of the embodiment of the present invention preferably contains a solvent.

Examples of the solvent include water, an organic solvent (for example, esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; ketones such as methyl ethyl ketone (MEK), methyl isobutyl ketone, and cyclohexanone; and alcohols such as methanol and butanol), and a mixed solvent thereof.

Among those, from the viewpoint that unevenness in surface states during coating hardly occurs, methyl ethyl ketone (MEK), ethyl acetate, or cyclohexanone is preferable.

The content of the solvent in the composition of the embodiment of the present invention is not particularly limited, but the content in the composition is preferably 10% to 95% by mass, and more preferably 30% to 80% by mass, with respect to the total mass of the composition.

In addition, the solvent may be used singly or in combination of two or more kinds thereof. In a case where two or more kinds of the solvents are used in combination, the total content thereof is preferably within the range.

<Other Components>

The composition of the embodiment of the present invention may contain components other than the above-mentioned respective components. Examples of such components include a binder resin, a polyfunctional amine, a polyfunctional thiol, a surfactant, a plasticizer, a surface lubricant, a leveling agent, a softening agent, an antioxidant, an antiaging agent, a light stabilizer, an ultraviolet absorber, an inorganic or organic filler, and metal powder.

The binder resin is not particularly limited, and examples thereof include an acrylic resin, a styrene-based resin, a vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer.

<Method for Preparing Curable Composition>

A method for preparing the curable composition is not particularly limited, and known methods can be employed. For example, the respective components can be mixed and then stirred by a known means to prepare a curable composition.

[Film]

The film of an embodiment of the present invention is a cured film formed by curing the above-mentioned composition of the embodiment of the present invention.

The thickness of the film of the embodiment of the present invention is not particularly limited, but is preferably 0.1 to 300 μm, and more preferably 1 to 100 μm.

<Method for Producing Film>

The method of producing a film of the embodiment of the present invention is not particularly limited, but examples thereof include a method of applying the above-mentioned composition of the embodiment of the present invention onto a base material and curing the composition by heating or irradiating the base material with light (for example, ultraviolet rays, visible light rays, and X-rays).

The base material is not particularly limited, and examples thereof include various plastic base materials.

Examples of the plastic base materials include a plastic base material obtained by using polyethylene terephthalate, polybutylene terephthalate, polyethylene naphthalene, polyethylene, polypropylene, cellophane, diacetyl cellulose, triacetyl cellulose, acetyl cellulose butyrate, polyvinyl chloride, polyvinylidene chloride, polyvinyl alcohol, an ethylene-vinyl acetate copolymer, polystyrene, polycarbonate, polymethylpentene, polysulfone, polyether ether ketone, polyether sulfone, polyether imide, polyimide, a fluorine resin, nylon, an acrylic resin, a polyamide, a cycloolefin, or the like. Among these, a plastic base material formed of polyethylene terephthalate, polyethylene naphthalate, or the like is preferable from the viewpoint that the mechanical strength is more excellent.

The base material may be a base material formed of only a plastic, but may also be a plastic base material which includes a primer layer on a surface thereof for the purpose of further improving the adhesiveness to the film.

In addition, for the purpose of further improving the adhesiveness to the film, the base material may be a base material which has been subjected to a surface treatment such as a surface roughening treatment by a sand blast method, a solvent treatment method, or the like, a corona discharge treatment, a chromic acid treatment, a flame treatment, a hot air treatment, an ozone treatment, an ultraviolet irradiation treatment, and a surface oxidation treatment.

Examples of the method for applying the composition of the embodiment of the present invention include extrusion coating methods performed by roll coating, kiss roll coating, gravure coating, reverse coating, roll brush coating, spray coating, dip roll coating, bar coating, knife coating, air knife coating, curtain coating, rip coating, die coating, or the like.

The heating method is not particularly limited, and examples thereof include methods using a blast dryer, an oven, an infrared dryer, a heating drum, or the like.

The temperature for heating is not particularly limited, but is preferably 30° C. to 150° C., and more preferably 40° C. to 120° C.

The heating period is not particularly limited, but is usually 1 minute to 6 hours. In a case of performing drying in an application device, the period is 1 minute to 20 minutes, and the heating after the application device, for example, the heating in the winding state is preferably set to from room temperature to 50° C.

Examples of the method for light irradiation include a method using a low-pressure mercury lamp, a medium-pressure mercury lamp, a high-pressure mercury lamp, a metal halide lamp, deep ultraviolet (UV) rays, a xenon lamp, a chemical lamp, a carbon arc lamp, or the like. The energy for light irradiation is not particularly limited, but is preferably 0.1 to 10 J/cm$^2$.

[Applications]

Since the film of the embodiment of the present invention has both excellent antistatic properties and excellent film hardness, it is useful as a material for a display (in particular, a flexible display), an electronic element, or the like. Further, the film of the embodiment of the present invention can be used as an antistatic film, and specifically, it is preferably used as a polarizing plate protecting film for a display.

In addition, in a case where the film of the embodiment of the present invention is used as a polarizing plate protecting film for a display, the film thickness is preferably 1 μm or more, more preferably 3 to 20 μm, still more preferably 5 to 15 μm, and particularly preferably 6 to 15 μm. Further, the strength in terms of a pencil hardness test is preferably H or more, more preferably 2 H or more, and still more preferably 3 H or more. In addition, the transmittance of the film is preferably 80% or more, more preferably 85% or more, and still more preferably 90% or more.

EXAMPLES

Hereinafter, the present invention will be described in more details with reference to Examples. The materials, the amounts of materials used, the proportions, the treatment details, the treatment procedure, or the like shown in the Examples below may be modified if appropriate as long as the modifications do not depart from the spirit of the present invention. Therefore, the scope of the present invention should not be construed as being limited to Examples shown below.

[Synthesis of Polyfunctional Compound]
(Synthesis of Compound A)

30 g of N-(2-aminoethyl)-1,3-propanediamine (manufactured by Aldrich), 301 g of $NaHCO_3$ [4.7 equivalents with respect to one —$NH_2$ group contained in N-(2-aminoethyl)-1,3-propanediamine], 1 L of dichloromethane, and 50 mL of water were put into a 3-neck flask with a capacity of 2 L, equipped with a stirrer, and the 3-neck flask was placed in an ice bath. Next, 232 g of acrylic acid chloride [3.3 equivalents with respect to one —$NH_2$ group, manufactured by Wako Pure Chemical Industries, Ltd.] was added dropwise to the 3-neck flask for 3 hours, and then the obtained reaction solution was stirred at room temperature for 3 hours. After confirming the loss of the raw materials by proton-nuclear magnetic resonance ($^1$H-NMR), the solvent was distilled off from the reaction mixture under reduced pressure, and the reaction mixture was dried with magnesium sulfate. The residue was filtered over Celite, the filtrate was recovered, and then the solvent was distilled off from the filtrate under reduced pressure. Lastly, the obtained residue was purified by silica column chromatography (ethyl acetate/methanol=9/1 (volume ratio)) to obtain a compound A having the following structure (yield of 43%).

Compound A

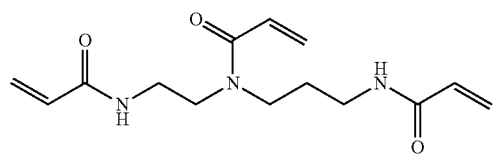

(Synthesis of Compound B)

By performing preparation in the same method as in the method for synthesizing the compound A, except that N-(2-aminoethyl)-1,3-propanediamine was replaced by bis(3-aminopropyl)amine (manufactured by Tokyo Chemical Industry Co., Ltd.), a compound B having the following structure (yield of 43%) was obtained.

Compound B

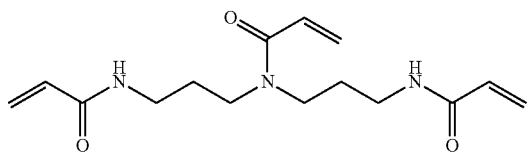

(Synthesis of Compound C)

By performing preparation in the same method as in the method for synthesizing the compound A, except that N-(2-aminoethyl)-1,3-propanediamine was replaced by N,N'-bis(3-aminopropyl)ethylenediamine (manufactured by Tokyo Chemical Industry Co., Ltd.), a compound C having the following structure (yield of 40%) was obtained.

Compound C

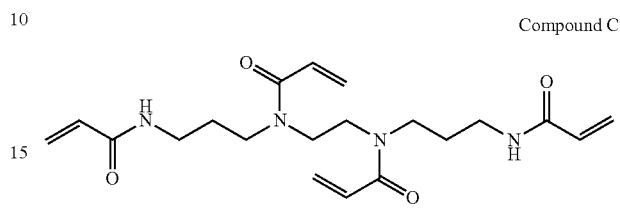

(Synthesis of Compound D)

By performing preparation in the same method as in the method for synthesizing the compound A, except that N-(2-aminoethyl)-1,3-propanediamine was replaced by N,N'-bis(2-aminoethyl)-1,3-propanediamine (manufactured by Tokyo Chemical Industry Co., Ltd.), a compound D having the following structure (yield of 41%) was obtained.

Compound D

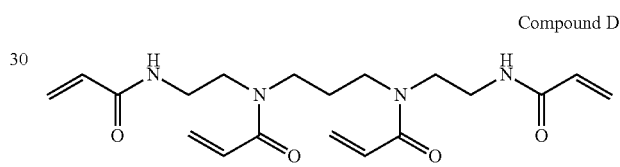

(Synthesis of Compound E)

By performing preparation by the same method as in the method for synthesizing the compound A, except that N-(2-aminoethyl)-1,3-propanediamine was replaced by diethylene glycol bis(3-aminopropyl)ether (manufactured by Tokyo Chemical Industry Co., Ltd.), a compound E having the following structure (yield of 41%) was obtained.

Compound E

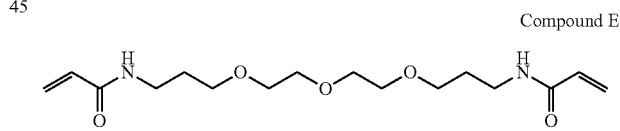

[Synthesis of Ionic Polymer]
(Synthesis of Ionic Polymer A)

An ionic polymer A shown below (a 30%-by-mass ethanol solution) was synthesized in accordance with Synthesis Example 2 described in JP4678451B. The weight-average molecular weight (Mw) of the obtained ionic polymer A was 300,000.

In addition, in the present Example, the weight-average molecular weight (Mw) of the ionic polymer is a value in terms of polystyrene, as measured by means of GPC.

For the GPC method, HLC-8020 GPC (manufactured by Tosoh Corporation) was used, and TSKgel Super HZM-H, TSKgel Super HZ4000, or TSKgel Super HZ2000 (manufactured by Tosoh Corporation, 4.6 mmIDx15 cm) as a column and tetrahydrofuran (THF) as an eluent were used.

Ionic polymer A

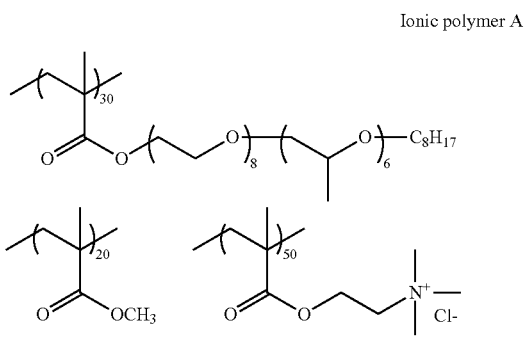

(Synthesis of Ionic Polymer B)

By performing preparation by the same method as the method for synthesizing the ionic polymer A, except that methacryloyloxyethyl trimethylammonium chloride was replaced by sodium methacrylate, an ionic polymer B shown below (a 30%-by-mass ethanol solution) was synthesized. The weight-average molecular weight (Mw) of the obtained ionic polymer B was 350,000.

Ionic polymer B

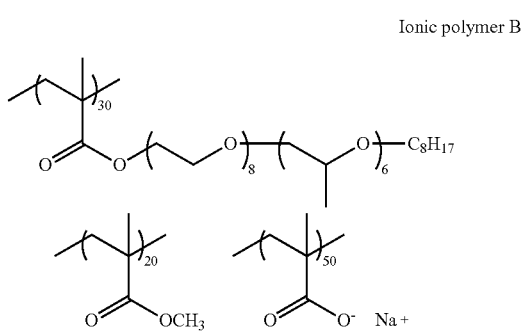

[Comparative Compound: Synthesis of DMAPAA-PTS]

Acryloylaminopropyl trimethylammonium p-toluenesulfonate (DMAPAA-PTS) was synthesized in accordance with Synthesis Example 1 described in JP5669373B.

[Comparative Compound: Synthesis of Ionic Polymer C]

30 g of DMAPAA-PTS manufactured above and 120 g of ethanol were mixed and adjusted to 78° C. Subsequently, a solution formed in which 0.1 g of V-601 (manufactured by Wako Pure Chemical Industries, Ltd.) was dissolved in 50 g of ethanol was added dropwise to the solution of the prepared DMAPAA-PTS in ethanol for 3 hours, and the solution was reacted at 78° C. for 3 hours. Thereafter, ethanol was distilled off under reduced pressure to obtain an ionic polymer C as an ethanol solution having a solid content of 30% by mass. The weight-average molecular weight (Mw) of the obtained ionic polymer C was 300,000.

Ionic polymer C

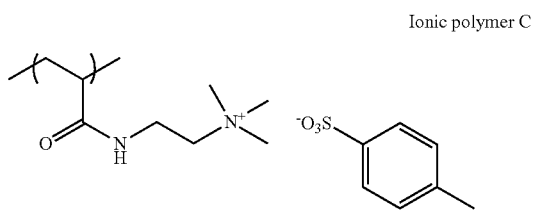

[Preparation of Curable Composition]

The components shown in Table 1 described below were mixed at the ratios (% by mass) shown in the same table to prepare a curable composition. Further, "-" in the table indicates that the components are not contained.

The respective components described in Table 1 are shown below.

<Polyfunctional Compound>

Compounds A to E: The compounds synthesized above were used.

Compound F: N-[Tris(3-acrylamidepropoxymethyl)methyl]acrylamide (manufactured by Wako Pure Chemical Industries, Ltd., the compound having the following structure)

Compound F

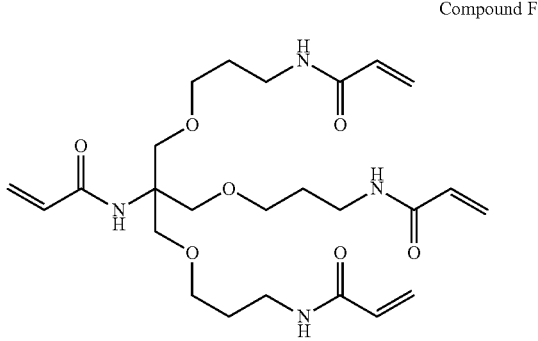 [SMILES: C=CC(=O)NCCCOCC(COCCCNC(=O)C=C)(COCCCNC(=O)C=C)NC(=O)C=C]

<Comparative (Meth)Acryloyl Compound>

MBA: Methylene bisacrylamide (manufactured by Tokyo Chemical Industry Co., Ltd.)

DPHA: Dipentaerythritol hexaacrylate (manufactured by Shin-Nakamura Chemical Co., Ltd.)

DMAPAA-PTS: Acryloylaminopropyl trimethylammonium p-toluenesulfonate (the one synthesized above was used)

<Ionic Polymer>

Ionic polymers A, B, and C: The ionic polymers synthesized above were used.

<Initiator>

IRGACURE 184: Photopolymerization initiator (manufactured by BASF Japan, Ltd.)

V-601: Thermal polymerization initiator (manufactured by Wako Pure Chemical Industries, Ltd.)

<Solvent>

Methyl Ethyl Ketone (MEK)

[Manufacture of Film]

The films of Examples 1 to 12 and Comparative Examples 1 to 7 were manufactured by the following procedure.

First, the curable composition produced as above was applied onto an easily adhesive polyethylene terephthalate (PET) film ("COSMOSHINE A4100" manufactured by Toyobo Co., Ltd.) using a bar coater, thereby forming a coating film. Subsequently, the coating film was subjected to UV exposure at an exposure dose of 2 J/cm$^2$ to form a cured film having a thickness of 10 μm.

The film of Example 12 was manufactured by the following procedure.

The curable composition produced as above was applied onto an easily adhesive PET film ("COSMOSHINE A4100" manufactured by Toyobo Co., Ltd.) film using a bar coater, thereby forming a coating film. Subsequently, the coating film was heated under the conditions of 80° C. and 4 hours to form a cured film having a thickness of 10 μm.

[Various Evaluations]
<Evaluation of Antistatic Properties>

The obtained cured film was cut in size of 10 cm×10 cm and left to stand in an atmosphere at a temperature of 25° C. and a relative humidity of 40% for 24 hours. Thereafter, a surface resistivity (Ω/□) after one minute from the application of a voltage was measured (temperature: 25° C., relative humidity: 40%, and applied voltage: 100 V), using a surface resistance measuring device (SME-8310 manufactured by TOA Electronics, Inc.), and evaluated according to the following standard. For practical uses, B or higher is preferable as an evaluation value for the antistatic properties.

The results are shown in Table 1.

(Evaluation Standards)
"A": The common logarithm (log SR) of the surface resistivity is less than 11.
"B": The log SR is 11 or more to less than 12.
"C": The log SR 12 or more.

<Evaluation of Film Hardness>

The pencil hardness of the obtained cured film was measured in accordance with the test method shown in JIS K5401 and evaluated according to the following standard. For practical uses, B or higher is preferable as an evaluation value for the film hardness.

The results are shown in Table 1.

(Evaluation Standards)
"A": The pencil hardness was 2 H or more.
"B": The pencil hardness was H.
"C": The pencil hardness was F or less.

TABLE 1

| | Curable composition | | | | | | | | | | | | |
|---|---|---|---|---|---|---|---|---|---|---|---|---|---|
| | Polyfunctional compound | | | | | | | | | Ionic polymer | | | |
| | | | | | | | | | | Ionic polymer A | | Ionic polymer B | |
| | | | | | | | | | | 30%-by-mass ethanol solution (total content) (% by mass) | Amount of solid content (% by mass) | 30%-by-mass ethanol solution (total content) (% by mass) | Amount of solid content (% by mass) |
| | Compound A (% by mass) | Compound B (% by mass) | Compound C (% by mass) | Compound D (% by mass) | Compound E (% by mass) | Compound F (% by mass) | MBA (% by mass) | DPHA (% by mass) | DMAPAA-PTS (% by mass) | | | | |
| Example 1 | 43.5 | — | — | — | — | — | — | — | — | 5 | 1.5 | — | — |
| Example 2 | — | 43.5 | — | — | — | — | — | — | — | 5 | 1.5 | — | — |
| Example 3 | — | — | 43.5 | — | — | — | — | — | — | 5 | 1.5 | — | — |
| Example 4 | — | — | — | 43.5 | — | — | — | — | — | 5 | 1.5 | — | — |
| Example 5 | 48 | — | — | — | — | — | — | — | — | 0.5 | 0.15 | — | — |
| Example 6 | 36 | — | — | — | — | — | — | — | — | 12.5 | 3.75 | — | — |
| Example 7 | 33.5 | — | — | — | — | — | — | — | — | 15 | 4.5 | — | — |
| Example 8 | 48.4 | — | — | — | — | — | — | — | — | 0.1 | 0.03 | — | — |
| Example 9 | — | — | — | — | 43.5 | — | — | — | — | 5 | 1.5 | — | — |
| Example 10 | — | — | — | — | — | 43.5 | — | — | — | 5 | 1.5 | — | — |
| Example 11 | 43.5 | — | — | — | — | — | — | — | — | — | — | 5 | 1.5 |
| Example 12 | 43.5 | — | — | — | — | — | — | — | — | 5 | 1.5 | — | — |
| Comparative Example 1 | 48.5 | — | — | — | — | — | — | — | — | — | — | — | — |
| Comparative Example 2 | — | — | — | — | — | — | 43.5 | — | — | 5 | 1.5 | — | — |
| Comparative Example 3 | — | — | — | — | — | — | — | 43.5 | — | 5 | 1.5 | — | — |
| Comparative Example 4 | — | — | — | — | — | — | — | 23.5 | — | 25 | 7.5 | — | — |
| Comparative Example 5 | — | — | — | — | — | — | — | 24.25 | 24.25 | — | — | — | — |
| Comparative Example 6 | — | — | — | — | — | — | — | — | 24.25 | — | — | — | — |

TABLE 1-continued

| | | | | | | | | | | | | |
|---|---|---|---|---|---|---|---|---|---|---|---|---|
| Comparative Example 7 | — | — | — | — | — | — | — | 43.5 | — | — | — | — | — |

| | Curable composition | | | | | Ratio (mass ratio) of solid content of polyfunctional compound and ionic polymer) |
|---|---|---|---|---|---|---|
| | Ionic polymer — Ionic polymer C | | Initiator | | | |
| | 30%-by-mass ethanol solution (total content) (% by mass) | Amount of solid content (% by mass) | Photo-polymerization initiator (% by mass) | Thermal polymerization initiator (% by mass) | Solvent (MEK) (% by mass) | |
| Example 1 | — | — | 1.5 | — | 50 | 96.7:3.3 |
| Example 2 | — | — | 1.5 | — | 50 | 96.7:3.3 |
| Example 3 | — | — | 1.5 | — | 50 | 96.7:3.3 |
| Example 4 | — | — | 1.5 | — | 50 | 96.7:3.3 |
| Example 5 | — | — | 1.5 | — | 50 | 99.7:0.3 |
| Example 6 | — | — | 1.5 | — | 50 | 90.6:9.4 |
| Example 7 | — | — | 1.5 | — | 50 | 88.2:11.8 |
| Example 8 | — | — | 1.5 | — | 50 | 99.9:0.1 |
| Example 9 | — | — | 1.5 | — | 50 | 96.7:3.3 |
| Example 10 | — | — | 1.5 | — | 50 | 96.7:3.3 |
| Example 11 | — | — | 1.5 | — | 50 | 96.7:3.3 |
| Example 12 | — | — | — | 1.5 | 50 | 96.7:3.3 |
| Comparative Example 1 | — | — | 1.5 | — | 50 | 100:0 |
| Comparative Example 2 | — | — | 1.5 | — | 50 | 96.7:3.3 |
| Comparative Example 3 | — | — | 1.5 | — | 50 | 96.7:3.3 |
| Comparative Example 4 | — | — | 1.5 | — | 50 | 75.8:24.2 |
| Comparative Example 5 | — | — | 1.5 | — | 50 | 100:0 |
| Comparative Example 6 | 24.25 | 7.3 | 1.5 | — | 50 | 76.9:23.1 |
| Comparative Example 7 | 5 | 1.5 | 1.5 | — | 50 | 96.7:3.3 |

| | Physical properties as film | |
|---|---|---|
| | Antistatic properties (surface resistance) | Film hardness (pencil hardness) |
| Example 1 | A | A |
| Example 2 | A | A |
| Example 3 | A | A |
| Example 4 | A | A |
| Example 5 | A | A |
| Example 6 | A | A |
| Example 7 | A | B |
| Example 8 | B | A |
| Example 9 | B | B |
| Example 10 | B | B |
| Example 11 | B | A |
| Example 12 | A | A |
| Comparative Example 1 | C | A |
| Comparative Example 2 | B | C |
| Comparative Example 3 | C | A |
| Comparative Example 4 | A | C |
| Comparative Example 5 | C | C |
| Comparative Example 6 | C | C |
| Comparative Example 7 | C | B |

From Table 1, it was shown that in Comparative Examples 2, 3, 6, and 7 using the polyfunctional (meth)acrylate compound, the uniformity of the composition was low and it was not possible to satisfy both the performances of the antistatic properties and the film hardness, whereas in Examples 1 to 12 using the ionic polymer including the polyfunctional (meth)acrylamide compound represented by General Formula (I) or the polyfunctional (meth)acrylamide compound represented by General Formula (II), and the ionic polymer including a repeating unit represented by General Formula (IV), the uniformity of the composition was high, and both the antistatic properties and the film hardness were satisfied to a more excellent extent.

Furthermore, from the comparison of Examples 1, and 5 to 8, it was shown that it was possible to satisfy both the antistatic properties and the film hardness to a more excellent extent by setting the mass ratio of the polyfunctional compound to the ionic polymer in the curable composition to 90/10 to 99.8/0.2.

Moreover, from the comparison between Examples 1 to 4 and Examples 9 and 10, it was shown that in a case where the compounds A to D were used as the polyfunctional compound, it was possible to satisfy both the antistatic properties and the film hardness to a more excellent extent.

In addition, from the comparison between Example 1 and Example 11, it was shown that in a case where the repeating unit having a quaternary ammonium salt structure was used as the repeating unit having an ionic group, the antistatic properties were more excellent.

On the other hand, the curable composition of Comparative Example 1 did not have excellent film hardness, but since it did not contain an ionic polymer, its film hardness was excellent but a desired antistatic performance was not obtained.

Furthermore, the curable composition of Comparative Example 2 contained methylene bisacrylamide (MBA) instead of at least one polyfunctional compound selected from the group consisting of the compound represented by General Formula (I) and the compound represented by General Formula (II), but a desired antistatic performance was not obtained.

In addition, the curable compositions of Comparative Examples 3 and 4 contained the polyfunctional (meth)acrylate compound instead of the polyfunctional compound, the compatibility between the polyfunctional (meth)acrylate compound and the ionic polymer was low, and any of Comparative Examples, it was not possible to satisfy both the antistatic properties and the film hardness to an excellent extent. Specifically, in a case where the curable composition contained an ionic polymer in an amount required to express good antistatic properties, the film hardness became insufficient (Comparative Example 4). On the other hand, in a case where the curable composition contains an acrylate in an amount required to express good film hardness, the antistatic properties became insufficient (Comparative Example 3).

Moreover, the curable composition described in Comparative Example 5 contained the polyfunctional (meth)acrylamide compound and the acryloylaminopropyl trimethylammonium p-toluenesulfonate (DMAPAA-PTS) as in JP5669373B, but the film hardness and the antistatic performance did not satisfy desired requirements.

In addition, the curable composition described in Comparative Examples 6 and 7 contained the polyfunctional (meth)acrylate compound and the ionic polymer which is a polymer of DMAPAA-PTS as in JP5669373B, but the compatibility between the polyfunctional (meth)acrylate compound and the ionic polymer was low, and the antistatic properties and the film hardness could not both be satisfied to an excellent extent in any of the Comparative Examples. In addition, from the comparison between Comparative Examples 3 and 4 and Comparative Examples 6 and 7, it was presumed that in a case where an ionic polymer C having no polyethylene glycol (PEG) structure as in the ionic polymer A, the compatibility of the polyfunctional monomers was poorer, and the antistatic properties could be sufficiently exhibited.

What is claimed is:
1. A curable composition comprising:
at least one polyfunctional compound selected from the group consisting of the following compound A, compound B, compound C, and compound D:

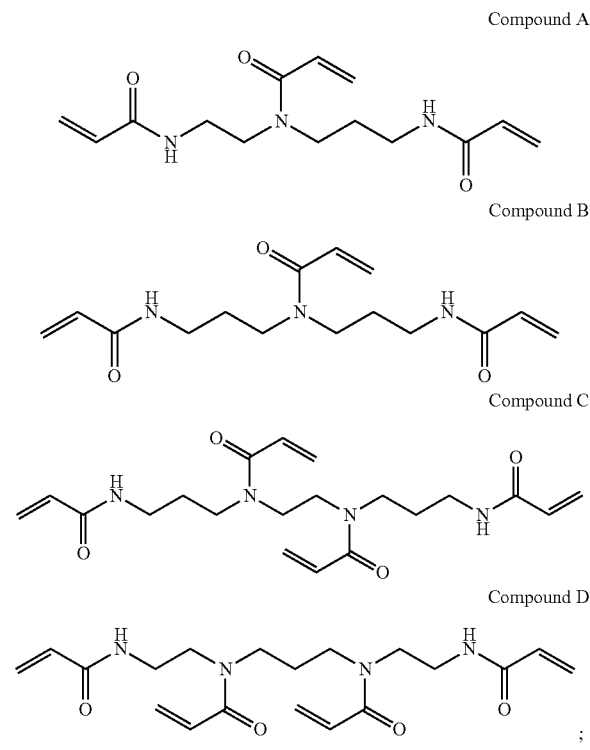

and
an ionic polymer including a repeating unit represented by General Formula (IV) and a repeating unit having an ionic group,

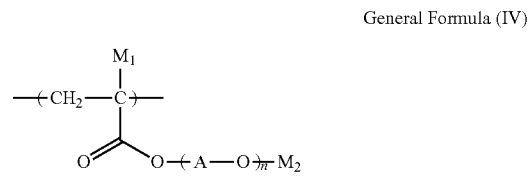

in General Formula (IV), $M_1$ represents a hydrogen atom or a methyl group, $M_2$ represents a hydrogen atom, or a substituted or unsubstituted hydrocarbon group having 4 to 25 carbon atoms, A represents a substituted or unsubstituted alkylene group having 2 to 5 carbon atoms, and n represents an integer of 3 to 50.

2. The curable composition according to claim 1, wherein the repeating unit having an ionic group included in the ionic polymer is represented by General Formula (V), General Formula (V)

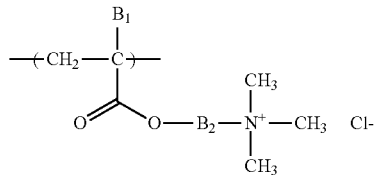

in General Formula (V), $B_1$ represents a hydrogen atom or a methyl group, and $B_2$ represents a substituted or unsubstituted alkylene group having 2 to 5 carbon atoms.

3. The curable composition according to claim 1, wherein the mass ratio of the polyfunctional compound to the ionic polymer is 90/10 to 99.8/0.2.

4. The curable composition according to claim 2, wherein the mass ratio of the polyfunctional compound to the ionic polymer is 90/10 to 99.8/0.2.

5. The curable composition according to claim 1, further comprising an initiator.

6. The curable composition according to claim 2, further comprising an initiator.

7. The curable composition according to claim 3, further comprising an initiator.

8. The curable composition according to claim 4, further comprising an initiator.

9. A film formed by curing the curable composition according to claim 1.

10. A film formed by curing the curable composition according to claim 2.

11. A film formed by curing the curable composition according to claim 3.

12. A film formed by curing the curable composition according to claim 4.

13. The film according to claim 9, wherein the film is an antistatic film.

* * * * *